Jan. 23, 1951 V. W. JONES 2,538,872
DEFROSTING LOCK
Filed May 8, 1948 2 Sheets-Sheet 1

INVENTOR
VIRGIL W. JONES
BY F. D. Hicks
ATTORNEY

Jan. 23, 1951 V. W. JONES 2,538,872
DEFROSTING LOCK
Filed May 8, 1948 2 Sheets-Sheet 2
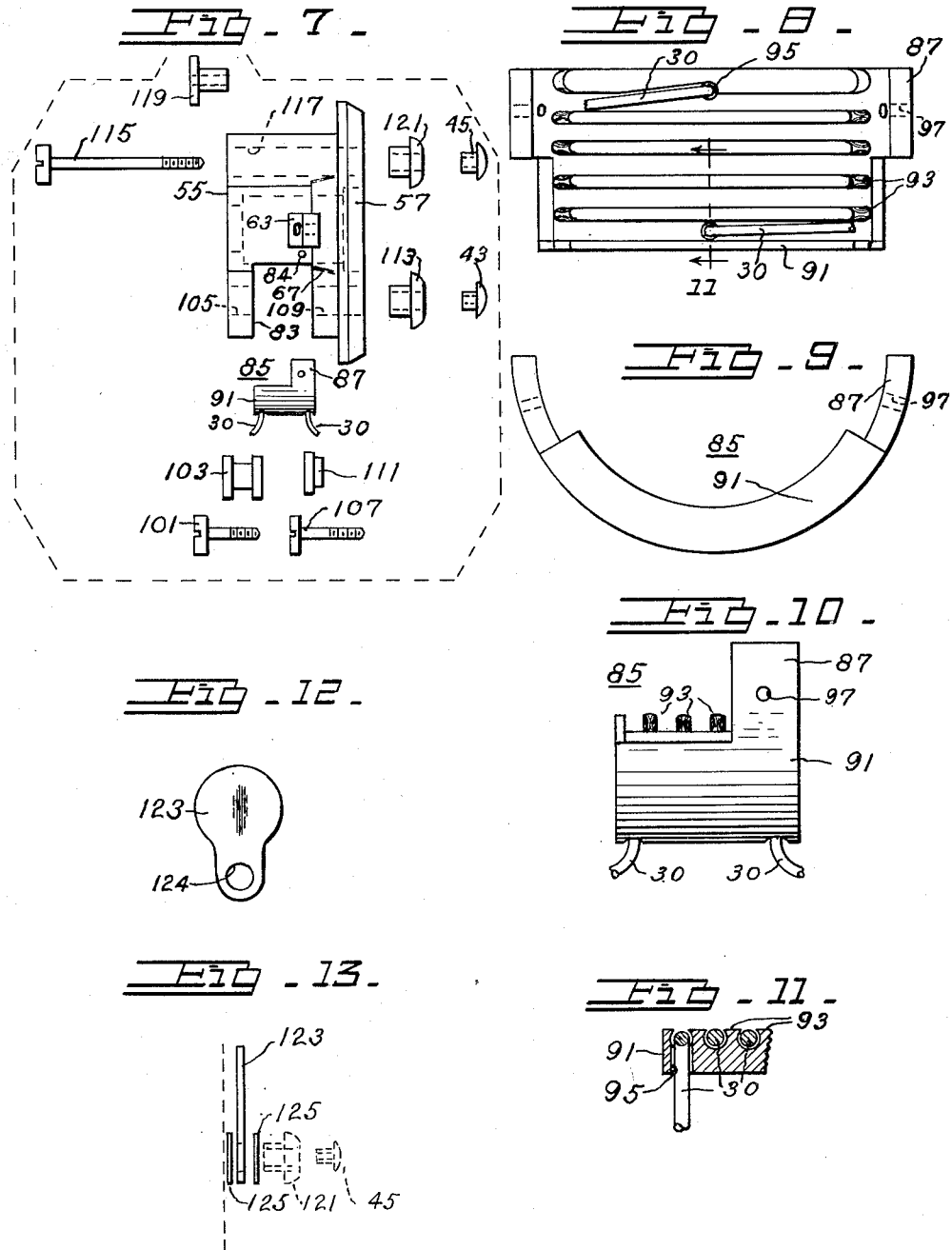
INVENTOR
*VIRGIL W. JONES*
BY *F. D. Hicks*
ATTORNEY Patented Jan. 23, 1951

2,538,872

UNITED STATES PATENT OFFICE 2,538,872

DEFROSTING LOCK

Virgil W. Jones, Detroit, Mich.

Application May 8, 1948, Serial No. 25,844

7 Claims. (Cl. 70—431)

The invention pertains to a defrosting lock and control system and more particularly to such apparatus for installation and use on vehicles such as automobiles and air craft on which the conventional locks so often are frozen and inoperative due to exposure to rain or melting snow under low temperature conditions.

It is an object of the invention to provide a defrosting lock arrangement which is convenient and reliable for installation and operation in combination with the conventional latch and lock arrangements upon vehicles.

It is also an object of the invention to provide such a defrosting lock arrangement which may be applied to the conventional automobile tire locks and trunk lock arrangements as well as to the door lock of an automobile.

It is a further object of my invention to provide a vehicle defrosting lock arrangement which is controlled externally of the vehicle in such a manner as to be convenient for use by an authorized person who is familiar with the operation but which is not so convenient as to tempt children and other unauthorized meddlers.

Another object of the invention is to provide such lock defrosting apparatus including protection means to avoid excessive heating of the lock and drainage of the battery either by an unauthorized or an authorized person.

The invention will be more readily understood, along with additional objects and advantages thereof, by reading the following specification in conjunction with the appended drawings, in which:

Fig. 7 is a side elevational exploded view of such a lock showing the various screws, insulation grommets, and the electric heater element, separately and adjacent the position of installation, the heater wire being broken away;

Fig. 8 is an enlarged plan view of the electric heater element;

Fig. 9 is an edge or end elevational view of the heater;

Fig. 10 is a side elevational view of the electric heater element, the same as appears in Fig. 7, but substantially enlarged;

Fig. 11 is a fragmentary cross-sectional view of the heater taken on line 11—11 in Fig. 8;

Fig. 12 is a plan view showing a dust cap which may be provided in combination with such a defrosting lock to exclude dust and sand from entering the lock; and Fig. 13 is an edge elevational view of such a dust cap showing how it may be installed upon one of the rubber insulation grommets, shown dotted, with a pair of thin washers, for holding it snugly against the face of the lock.

Figure 1:
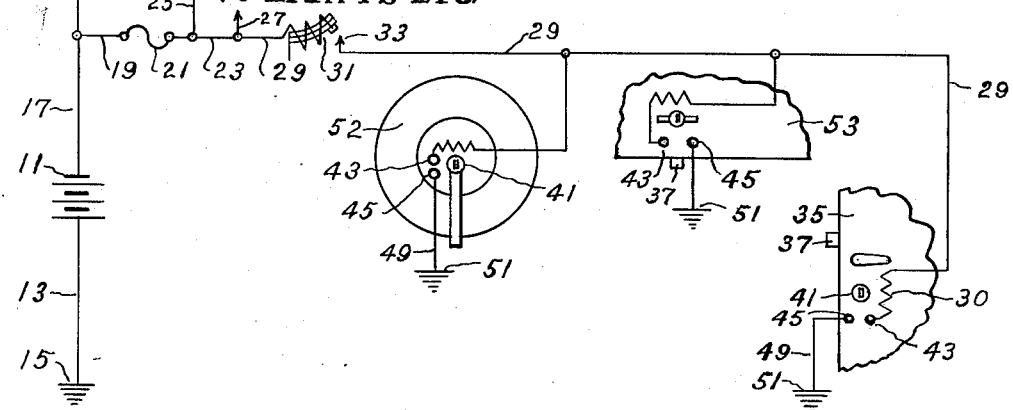
Fig. 1 is a schematic view diagrammatically representing my defrosting lock system as applied to the locked door, trunk compartment and spare tire of an automobile.
Figure 2:
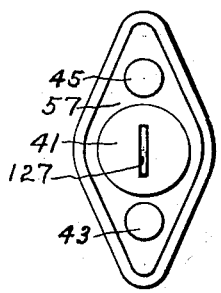
Fig. 2 is a front elevational view showing a lock provided with the externally operable controls.

Referring more specifically to Fig. 1 of the drawings, I have illustratively shown, by diagrammatic representation, my defrosting lock arrangement as installed upon a conventional automobile. The battery 11 of a conventional automobile is for convenience in wiring usually grounded, as by a conductor 13, extending from one terminal of the battery to a grounded connection on the frame of the car, as represented at 15. From the other terminal of the battery 11 suitable conductors extend to supply the electrical accessories of the automobile, as by a conductor 17, from which a conductor 19 may be connected extending through a fuse 21 to a conductor 23, and a desired number of branch conductors 25, 27, etc. may branch therefrom to supply the ignition, lights, etc., as indicated.

In accordance with my invention I provide a conductor 29 extending to energize heater elements 30 associated with the various outside exposed locks of the automobile, and this conductor 29 connects off through a time delay overload switch 31, which is selected or adjusted so that it will open after a predetermined time interval when current flows in any one of the lock defrosting heaters 30. There are various overload switches suitable for this purpose, and as represented this may be a well known thermal type of switch operated by a bi-metal strip heated by the current causing it to bend and open the switch. Normally this switch engages its contact 33 from whence the defrosting supply conductor 29 connects.

Figure 3:
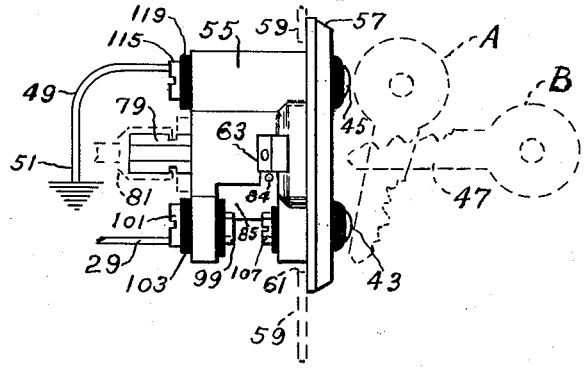
Fig. 3 is a side view of such a lock, representing connected wires and showing in dotted lines the two positions of a key, "A" representing the defrosting operation, and "B" representing the insertion of the key into the lock in the usual manner after the lock has been thawed out.
Figure 4:
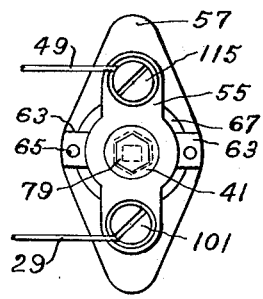
Fig. 4 is a rear elevational view of such a lock.
Figure 6:
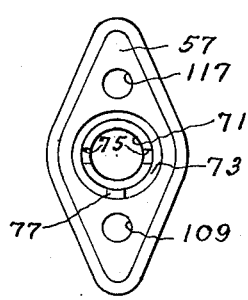
Fig. 6 is a front view of the lock casing and its front plate with the lock and the contact screws removed to provide an interior view thereof.
Figure 5:
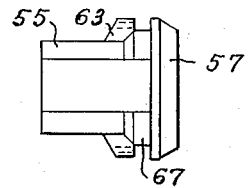
Fig. 5 is a side view thereof, opposite from heater.

A conventional automobile door 35 which usually has a latch 37 which may be withdrawn by the handle 39, and which may be locked or unlocked in a well known manner by a conventional lock 41, is represented in Fig. 1, and in accordance with my invention such a lock is conveniently defrosted by my electric heater element 30, which is suitably associated therewith for this purpose. One end of each electrical heater element 30 is connected with the energizing conductor 29, and the other end of each such element connects to an insulated control contact 43 which is externally exposed for convenient control, in a manner to be subsequently described in detail. By grounding any one of the externally exposed control contacts 43 the respective connected heater 30 is energized to warm the associated lock 41 to thaw it out before locking or unlocking it. To facilitate this control operation, a grounding contact 45 is provided mounted spaced apart from each control contact 43 at a convenient spaced distance to be easily bridged by a metallic member such as the key 47 for example, as shown dotted and in position A in Fig. 3, after which the key may be turned to position B for unlocking or locking the lock. As shown in Figs. 1 and 3, the grounding contact 45 may be insulated, and a conductor 49 may connect therefrom to ground on the frame of the vehicle at 51 to assume a good ground connection. But it should be understood that this conductor 49 may be omitted and the ground contact may ground directly to the car door or wall or through the structure whereon it is mounted, the ground connection then being completed from the door to the automobile through door hinges. But on aircraft and certain types of installations, the grounding may be completed through the conductor 49, as represented, or the grounds may be entirely replaced by a common conductor when grounding is not practical, grounding merely being an expedient for eliminating one conductor from the system where there is a metallic frame which may be substituted.

In accordance with my invention, all the outside exposed locks on a vehicle may be provided with a defrosting heater 30, and in Fig. 1, 52 represents a spare tire secured by a lock in a usual manner, and provided with my defrosting arrangement. Also 53 represents a trunk compartment closure, usually controlled by an externally exposed lock 41, and which may also be likewise provided with a defrosting heater 30. All such defrosting heaters 30 are connected to the same energizing conductor 29 and draw current through the time lag switch 31 which opens after a certain time interval to avoid excessive heating of the lock or drain on the battery.

In accordance with my invention, I provide an easily installed lock defrosting device for holding the electrical heater element 30 in an effective position adjacent the inwardly projecting portion of such a lock cylinder and exposing control contact means in a position such that the operator finds it very convenient to defrost the lock.

This I accomplish by providing a casing 55 (shown in Figs. 2-7) having a face plate 57 extending laterally from one end suitably for engaging flush against the outer surface of the outer wall 59, shown dotted in Fig. 3. Such outer wall 59, is provided with an aperture 61 of a suitable size and elongated or oval shape to receive the similarly shaped casing extending inwardly from the face plate. The face plate 57 may be cast integral with the casing or it may be a stamping pressed snugly thereon, and it is also elongated along one axis. Lugs 63 project from opposite sides of the casing 55 and as the casing is inserted the edges of the wall aperture 61 snap snugly thereover. The lugs 63 are provided with internally threaded apertures 65 wherein one or two set screws may be inserted for securing the casing in the outer wall member 59. The end of the casing adjacent the face plate is preferably flared out slightly to form a mounting flange 67 of slightly larger width for resting more securely in the aperture 61 in the outer wall.

For receiving and rotatively supporting the cylinder of a conventional lock 41 in operative relation to any conventional linkage to be thereby controlled, I provide an aperture 71 extending centrally through the face plate and the casing. As may be seen more clearly in Fig. 6, this central aperture is provided with an enlarged orifice or counter-face 73 adjacent the face plate for receiving outward end of such a lock cylinder and also grooves 75 extend axially in the opposite side surfaces for receiving the tumblers (not shown) when projected from such a lock cylinder in either of its two extreme positions. To accurately limit the position of the lock cylinder as it rotates, a usual stop projection 77 may be provided in the aperture for engaging a corresponding projection usually found on such lock cylinders. It is to be understood that this lock cylinder aperture may be made of suitable size and shape to operatively hold any make of lock cylinder which is to be utilized. Such lock cylinders are commonly provided on the inner end with a control projection 79 which projects from the inner end of the casing 55 for operative connection in the usual manner with a linkage 81 to be actuated, shown dotted, and which connection also serves to hold the lock cylinder in the casing but free to rotate for accomplishing the usual control of the latch through the linkage. Lock cylinders are sometimes also provided with a spring projected retainer washer (not shown) which expands into a suitable groove in lock aperture to hold the cylinder therein, in a well known manner.

As Figs. 3 and 7 show, one elongated side of the casing is provided with an opening 83 which opens into the side of the lock receiving aperture for receiving an arcuate shaped electric heater 85 which is inserted and secured therein by pins 84, pressed through lugs 87 into corresponding holes in the casing.

Figs. 8, 9, 10 and 11 show enlarged views of the electric heater which comprises an electric heater element or wire 30, of any suitable alloy or metal commonly used in electric heater elements, and selected of a length and cross-sectional size providing electrical resistance suitable for the voltage of the type of electrical energy source from which it is to be energized. Fig. 8 shows a plan view and Fig. 9 shows an end view, from which it may be seen that the heater has a support 91 of a generally arcuate form having inwardly projecting islands 93 around which the heater wire 30 is drawn and supported as a series of reversely bent loops. The ends of the heater element 30 are passed through and held in holes 95 in the support 91, also shown in Figs. 8 and 10. Also Fig. 11 shows how the islands 93 are formed with overhanging edges for more securely holding the wire adjacent to the lock cylinder but without any possibility of direct contact with the lock cylinder and the wire is installed by a process of threading it through and drawing out the slack. The heater wire support 91 is made of any suitable ceramic or other material commonly utilized for electric heaters.

The lugs 87 are provided with holes 97 through which pins 84 are conveniently pressed into suitable holes in the casing for holding the arcuate electric heater 85 up and curled around the lock cylinder but spaced slightly therefrom. This arrangement is such that the generated heat is focused or directed upon the lock cylinder for more rapidly thawing out congealed moisture accumulated therein. Besides working more rapidly, this arrangement utilizes the electric current more efficiently and makes for a smaller drain upon the battery.

To control the heater, one end of the heater wire 30 is held under a nut 99 applied on the inner end of a screw 101 the outer end of which holds, or is soldered to, the energizing conductor 29 from the system. The screw 101 passes through an insulating grommet 103 in an aperture 105 so that the screw is conveniently exposed for making the energizing connection at the time of installation. The other end of the electric heater wire 30 is connected and held by a screw 107 the threaded end of which screws into control contact 43 exposed on the face plate. This control contact screw 107 passes through a suitable aperture 109 through the front plate and into the casing, where it is insulated from the casing by insulation grommet 111, and from the face plate by insulation grommet 113, which has a lateral flange clamped to the face plate by the screw contact 43.

Control of the electric heater is conveniently accomplished by the operator merely grounding the control contact 43 briefly before inserting the key to unlock or lock the lock. To facilitate this operation I preferably provide a grounding contact 45 spaced on the face plate at a suitable convenient distance from the control contact 43. This spaced distance is preferably less than the length of a key so that the control is very easily accomplished by first applying the key, as shown in position A in Fig. 3, and then turning it to the position B for the usual operation in the lock.

Although the grounding contact 45 might be a bright raised portion on the face plate for grounding through the door and its hinges, when on a metal door, I prefer to provide this contact internally threaded, as shown, to screw upon the threaded end of a grounding screw 115 passing through an aperture 117, though the portion of the casing on the opposite side from the heater. Suitable grommets 119 and 121 serve to insulate the grounding screw and contact. The grounding conductor 49 is soldered to or held under the head of the grounding screw for completing the connection to a ground 51 on the frame of vehicle or automobile. The conductors 49 and 29 which are connected to my lock defrosting arrangement, are preferably led into the door through flexible armored cables.

Figs. 12 and 13 show a dust cap 123 provided with an aperture 124 suitable for insertion of the soft rubber grommet 121 therethrough. A pair of thin washers 125 are preferably also applied on the grommet 121, one on each side of the dust cap. When the threaded contact 45 clamps the soft rubber grommet 121 toward the face plate 57, the dust cap is held snugly therebetween at any position to which it may be turned. The dust cap may be provided with a detent pressed therein suitably to fit over and into the key slot 127 in the outer end of the lock cylinder 41, but such an arrangement while excluding dust and sand has been found ineffective for excluding the water from rain and melting snow.

Installation of my lock defrosting means is readily accomplished on any automobile even though in some cases it may be necessary to file out the lock opening in the door, or outer wall, suitably to receive the elongated casing 55, with the face plate 57 applied snugly on the outer surface. It is to be understood that the lock defrosting casing and the face plate 57 may be installed with the elongated axis disposed either vertically or horizontally, and of course the shape thereof may be varied somewhat to fit different installation requirements. The face of the plate 57 may be chromium plated or otherwise provided with a suitable desired finish.

It is apparent that within the scope of my invention modifications and different arrangements may be made other than herein disclosed, and the present disclosure is illustrative merely, the invention comprehending variations thereof.

What is claimed as the invention is:

1. In a vehicle lock defrosting device the combination of, an electrical heater, an energizing terminal connected to one end of said heater, a control contact connected to the other end of said heater, support means for mounting a lock with one end externally exposed and mounting said heater adjacent the inner portion of such an externally exposed vehicle lock for warming the lock, electrical insulation means cooperative with said support means to support said energizing terminal for convenient connection with a source of current on the vehicle, and electrical insulation means cooperative with said support means for supporting said control contact exposed externally adjacent the exposed portion of the lock for convenient control of the heater to warm the lock preparatory to unlocking or locking it.

2. In a vehicle defrosting lock mounting arrangement the combination of, a casing having a face plate adapted to engage the outer surface of the outer wall of a vehicle around a lock to be externally exposed, said casing having an inwardly projecting portion, said casing inwardly projecting portion and face plate being suitably apertured for receiving and operatively supporting a lock cylinder with the key controlled end of such a lock cylinder externally exposed, the inwardly projecting portion of said casing being adapted for supporting an electrical heater adjacent the lock for conveniently warming it preparatory to locking or unlocking operation thereof, and an electrical heater supported suitably to be adjacent to such a lock cylinder to warm the lock cylinder while the lock cylinder is freely rotatable in a usual manner.

3. A vehicle defrosting lock mounting arrangement in accordance with claim 2 and further characterized by said casing having a control contact aperture opening externally through said face plate adjacent the key controlled exposed end of a lock cylinder supported in the casing and face plate, a control contact connected to one end of said electrical heater, electrical insulation supporting said control contact in insulated relation in said control contact aperture for convenient external control of the heater, and insulated connection means for conveniently connecting the other end of said heater to an energizing conductor extended from a source of current of a vehicle whereupon the device may be installed.

4. A defrosting vehicle lock and mounting comprising, a casing having a face plate elongated along one axis and adapted for engaging the outer surface of the outer wall of a vehicle, said casing projecting from said face plate and having a cross-section smaller in width and length than the respective width and length of said face plate for projecting inwardly through an aperture in the vehicle outer wall which is covered by the face plate, a lock cylinder, said face plate and casing having a central aperture of suitable diameter and shape for receiving and operatively holding said lock cylinder rotatively with its key receiving end outwardly exposed, an electric heater element, support means mounting said heater element on said casing, a contact aperture of smaller diameter adjacent the lock aperture and in one elongated end of said face plate and casing, a control contact in said contact aperture, means mounting said control contact in insulated relation with one end exposed externally of said face plate, and one end of said heater being connected to said control contact.

5. A defrosting vehicle lock and mounting in accordance with claim 4 and further characterized by the inwardly projecting portion of said casing being apertured for exposing the lock cylinder directly to the heater, said support means being conformed to have an inner concave shape, and said support means supporting the heater element on the inner side thereof for projecting heat inwardly upon the tumbler projection openings of the rotative lock cylinder mounted in the casing.

6. A defrosting vehicle lock and mounting in accordance with claim 4 and further characterized by having a grounding contact aperture in said face plate and casing on the opposite side of the lock aperture from the control contact, and a grounding contact disposed in said grounding contact aperture with one end projecting beyond the outer surface of said face plate to be conveniently bridged together with said control contact.

7. A vehicle defrosting lock mounting device comprising, a casing adapted to be mounted upon a vehicle surrounding the inner portion of an externally exposed vehicle lock, an electrical heater carried by said casing for warming an associated lock, said casing having an insulated terminal connecting from one end of said electrical heater and exposed for convenient connection to an energizing conductor from a vehicle source of current having a terminal grounded in a usual manner, a control contact connected to the other end of said electrical heater, and means supporting said control contact electrically insulated and in an externally exposed position to be conveniently engaged for grounding on adjacent vehicle structure to energize the heater for defrosting an associated lock.

VIRGIL W. JONES.

REFERENCES CITED

The following references are of record in the file of this patent:

UNITED STATES PATENTS

| Number | Name | Date |
|---|---|---|
| 1,690,118 | Julyan | Nov. 6, 1928 |
| 1,936,391 | Harrower | Nov. 21, 1933 |
| 2,224,596 | Desfachelles | Dec. 10, 1940 |
| 2,232,577 | West | Feb. 18, 1941 |
| 2,302,117 | Gomersall | Nov. 17, 1942 |
| 2,371,534 | McGrath | Mar. 13, 1945 |